United States Patent [19]
Zeper

[11] Patent Number: 5,386,227
[45] Date of Patent: Jan. 31, 1995

[54] PROMPTER FOR VIDEO CAMERAS

[76] Inventor: Roy Zeper, 1704 Chippewa Ridge, Ambler, Pa. 19002

[21] Appl. No.: 940,178

[22] Filed: Sep. 3, 1992

[51] Int. Cl.⁶ .................. H04N 5/222; H04N 5/225
[52] U.S. Cl. .................... 348/61; 348/375; 348/722
[58] Field of Search .............. 358/229, 185, 93, 209, 358/909; 352/4; 348/61, 375, 722

[56] References Cited

U.S. PATENT DOCUMENTS

| | | | |
|---|---|---|---|
| 2,926,559 | 4/1953 | Oppenheimer | 352/4 |
| 2,981,144 | 9/1957 | Frenes et al. | 352/4 |
| 4,894,722 | 1/1990 | Suzuki | 358/185 |
| 5,025,320 | 6/1991 | Kyhl | 358/93 |

FOREIGN PATENT DOCUMENTS

| | | | |
|---|---|---|---|
| 271860 | 3/1963 | Australia | 352/4 |
| 1276881 | 11/1989 | Japan | H04N 5/222 |
| 4196877 | 7/1992 | Japan | H04N 5/222 |

*Primary Examiner*—Joseph Mancuso
*Assistant Examiner*—Wendy R. Greening

[57] ABSTRACT

This invention relates to a light-weight inexpensive portable prompter for video cameras which presents a moving textual script that can be read directly by a person in front of the camera while he is being videotaped. The prompter comprises a script-housing secured to a mounting plate which can be easily attached to the video camera, simultaneously and automatically aligning the script-housing adjacent to and under the lens of the camera with no part of said prompter within the viewing angle of said camera lens.

6 Claims, 5 Drawing Sheets

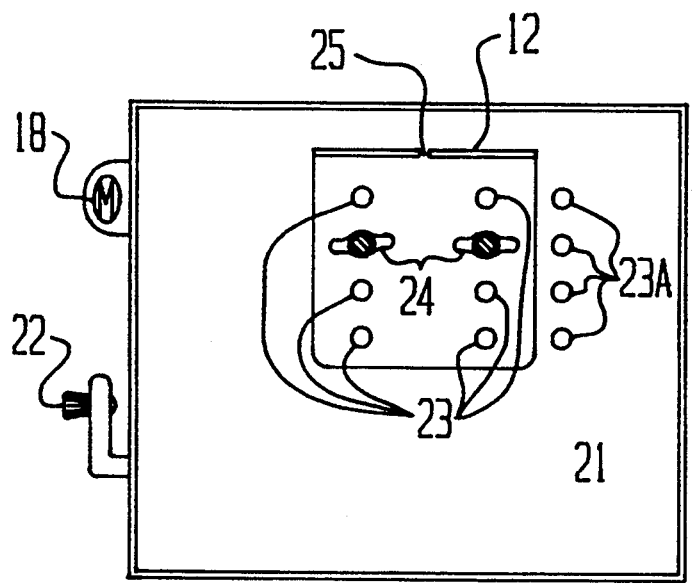
FIG. 6
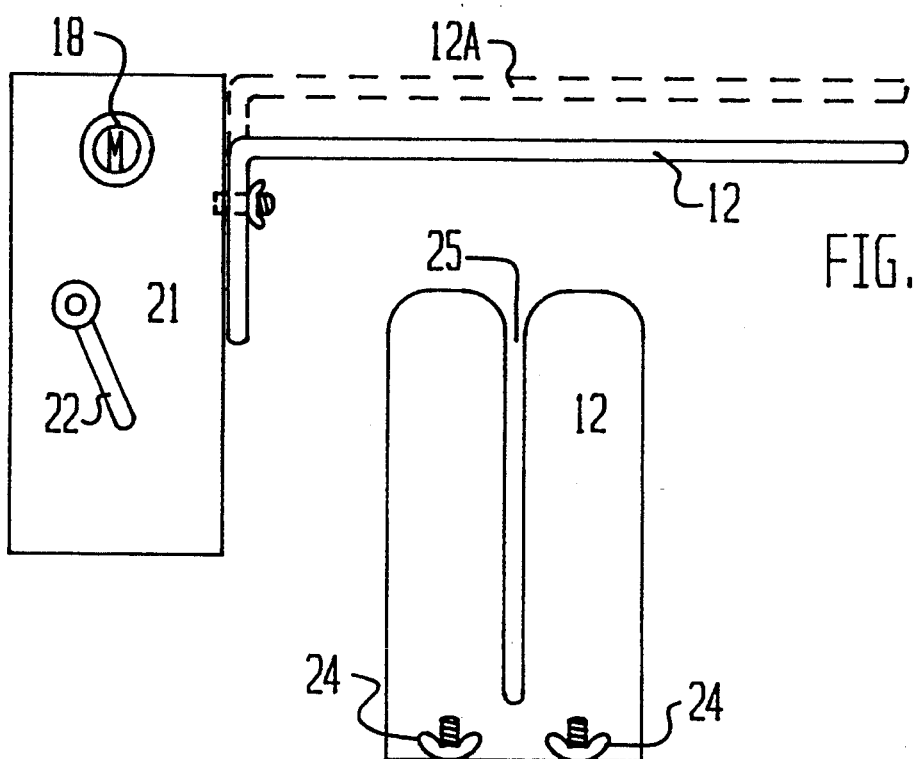
FIG. 7
FIG. 8

PROMPTER FOR VIDEO CAMERAS

FIELD OF THE INVENTION

This invention relates to cuing apparatus for video cameras which uses a moveable message strip with its message visible to a person in front of the camera.

DESCRIPTION OF THE PRIOR ART

One of the problems encountered when videotaping a person speaking directly to the viewing audience (which is the camera lens), while on location and not within a television studio, is the necessity of providing the speaker with a convenient visual display of the textual script material.

In the television studio this is solved with the teleprompter system. This method requires extremely heavy, complicated, cumbersome and expensive TV receiver equipment, also a person situated off the set to advance the script using a close-circuit television system. These limitations make it impractical for location taping in the field, and obviously, such a set-up would be impossible for the individual home video camera owner.

OBJECTS OF THE INVENTION

The principle object of the invention is to furnish an inexpensive light-weight portable cuing apparatus which supplies the written message directly under the camera lens for the speaker and does not interfere with the recording operation.

A further object of the invention is to provide apparatus as aforesaid in which the speaker has the ability to read the script as well as to control its advancement, eliminating heavy complicated synchronous mechanisms which make it impossible to hand-hold the camera together with the prompter unit.

Another object of the invention is to provide cuing apparatus in which the script material may be quickly and easily placed into the cuing apparatus and quickly and easily repositioned for repeat useage.

Still another object of the invention is to provide cuing apparatus for video cameras as aforesaid which is attachable to the camera and can be hand-held together with said camera.

A further object of the invention is to provide cuing apparatus which presents the textual script material adjacent to and under the camera lens that can be read directly by the speaker without the necessity of using a semi-transparent mirror or translucent reflective medium in front of the camera lens that would yield mirrored reverse lettering.

Other objects and advantageous features of the invention will be apparent from the description and claims.

DESCRIPTION OF THE INVENTION

The apparatus of my invention is extremely light-weight, portable and can be used with camcorders and other video cameras. It can be hand-held, and its simplicity of operation and inexpensive cost to manufacture would make it available to the ordinary person who owns a VHS camera or camcorder.

DESCRIPTION OF THE DRAWINGS

The nature and characteristic features of the invention will be more readily understood from the accompanying drawings forming part hereof in which:

FIG. 6 is a rear view of the cuing apparatus shown in FIG. 5 illustrating a method of adjusting the position of the script-housing in relation to its attached mounting plate. FIG. 7 is a side view of the cuing apparatus shown in FIGS. 5 and 6.

FIG. 8 is a bottom plan view of the cuing apparatus shown in FIGS. 5, 6, and 7 which shows the nuts-and-bolts method of securing and positioning the script-housing to the mounting plate.

It should, of course, be understood that the description and drawings herein are illustrative merely and that various modifications and changes can be made in the structure disclosed without departing from the spirit of the invention.

DESCRIPTION OF THE PREFERRED EMBODIMENTS

Figure 1:
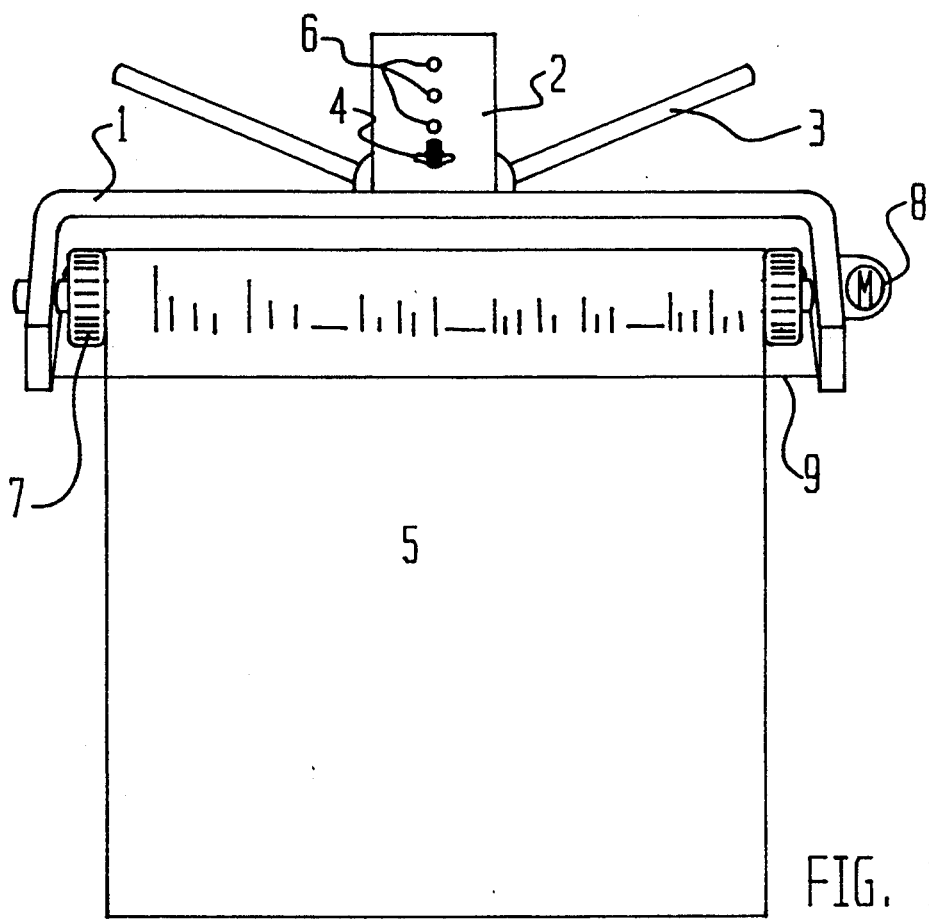
FIG. 1 is a slightly elevated frontal view of the cuing apparatus of my invention mounted upon a tripod, utilizing a "U" frame script-housing to support the take-up roller.

Referring now more particularly to the drawing in FIG. 1, the script-housing 1 in the form of a "U" frame supports the take-up roller 7 to which the script material 5, such as a roll of paper, is attached and will roll up upon said take-up roller 7 when the motor 8 is activated. The other end of the script paper merely hangs down freely and is unattached.

Figure 3:
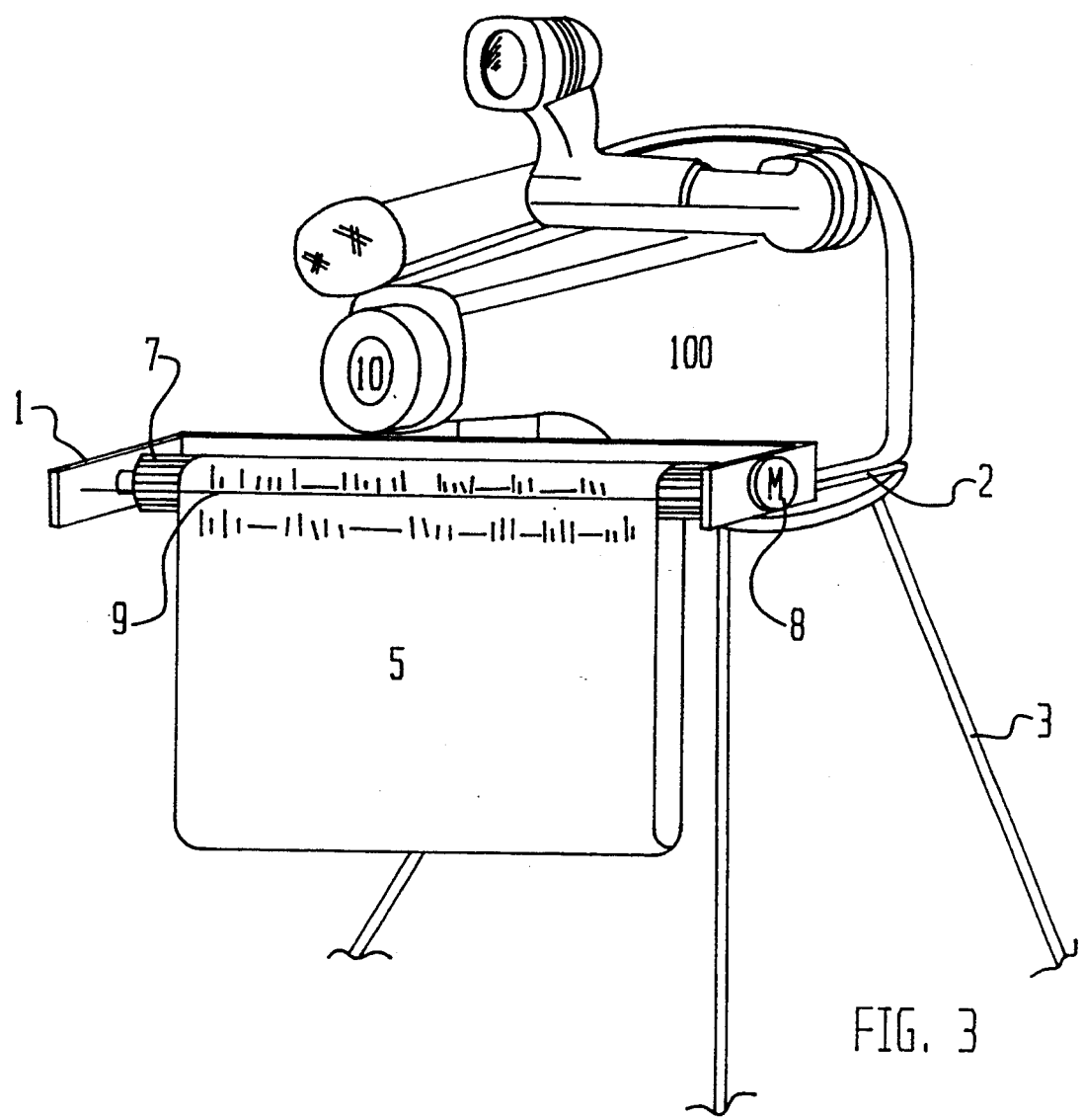
FIG. 3 is a perspective view of the cuing apparatus shown in FIG. 1 mounted upon a tripod together with a video camera, with the script material forming a continuous loop.

Said script-housing 1 is secured to the mounting plate 2 which in turn is secured to the tripod 3. This is accomplished by aligning the camera mounting bolt of said tripod 3 to protrude through one of the holes 6 in said mounting plate 2 and then being secured by the wing nut 4. The script guide 9, such as a rubber band stretched between the arms of said "U" frame 1 serves to guide the speaker to read just above said script guide 9 so that his gaze is just under the camera lens which is shown in FIG. 3.

I have conducted numerous tests with different people under different circumstances which surprisingly reveal that if the speaker is looking a few inches under the camera lens, it appears on the replay that he is looking into the lens and talking directly to the viewing audience.

If the motor 8 is a hysteresis motor, or with permanent magnets and a slip-clutch, its shaft can be rotated manually. This enables the roll of script paper 5 to simply be pulled down by hand, unwinding from the take-up roller 7 so that the speaker can make another "take" if the first recording is unsatisfactory. This method would be extremely desirable by television newscasters on location whereby they could easily write their intended news report on the script paper 5 and scotchtape it to the take-up roller 7, and then read it while the video camera is taping him or her.

Figure 2:
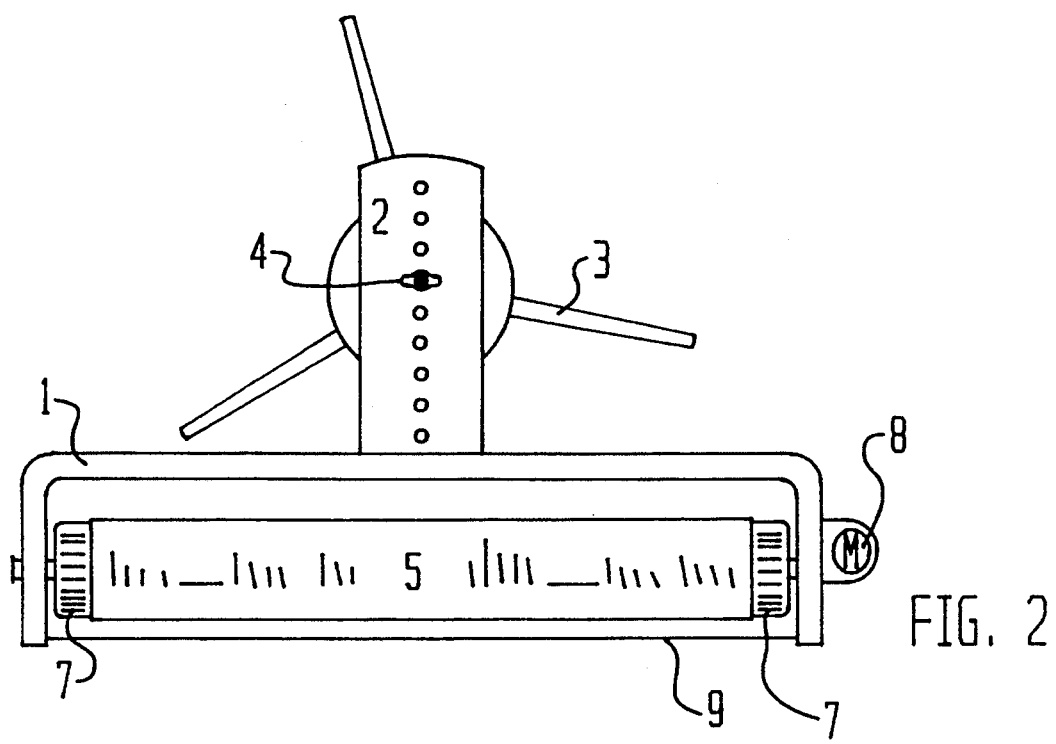
FIG. 2 is a top plan view of the cuing apparatus shown in FIG. 1.

In FIG. 2 we see a top plan view of FIG. 1.

In FIG. 3 I show the mounting plate 2 sandwiched between the tripod 3 and the video camera 100. Here I show both ends of the script paper 5 taped together to form a continuous loop. Lifting this loop of script paper 5 up,off the take-up roller 7 permits said script paper 5 to be manually rotated forward or backward easily and quickly so that the speaker can begin reading at any desired section. It enables a continuous repeat of the textual material for the speaker. The external surface of said take-up roller 7 is of a non-slippery composition such as rubberized, thus maintaining drive friction with said revolving script paper 5.

Figure 4:
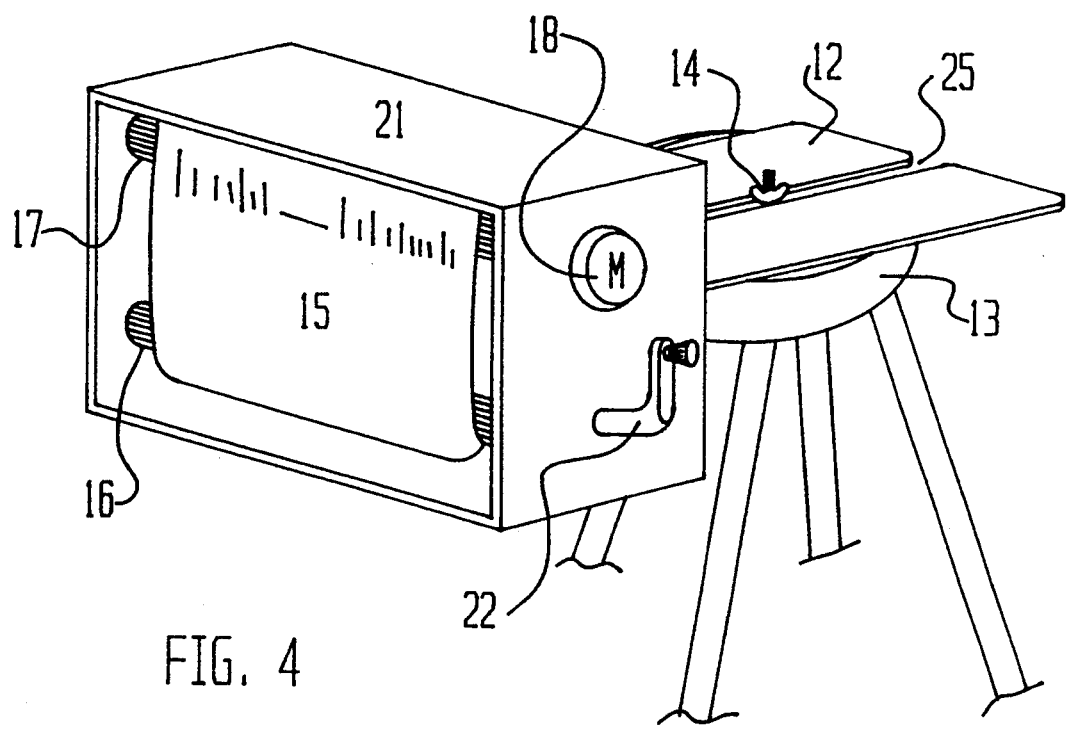
FIG. 4 is a view in perspective showing an embodiment of the cuing apparatus of my invention with the inclusion of a script supply-roller.

In FIG. 4 I show an embodiment whereby the script-housing 21 is box-like with elongated sides to enable the support of the bottom supply-roller 16 as well as the take-up roller 17. The attached mounting plate 12 is fastened upon the tripod 13 by a wing nut 14. The roll of script paper 15 upon which the textual material is written, feeds upwardly from said bottom supply-roller 16 to said top take-up roller 17. In FIG. 4 as well as in FIGS.5 and 8, I also show a variation in the configuration of the mounting plate 12, utilizing an open-end slot 25 instead of individual holes. This slot 25 is inserted under the loosened wing nut 14 on the tripod; or between the loosened bolt 19 and the base of the camera 200 of FIG. 5. Then by simply sliding back the mounting plate 12 to the furthest point it will go, and then tightening the wing nut 14, or the bolt 19, the script-housing is automatically positioned and secured.

It is obvious that the script-paper 15 may be secured to the upper take-up roller 17 and the other end left hanging free, as shown in FIG. 1.

Figure 5:
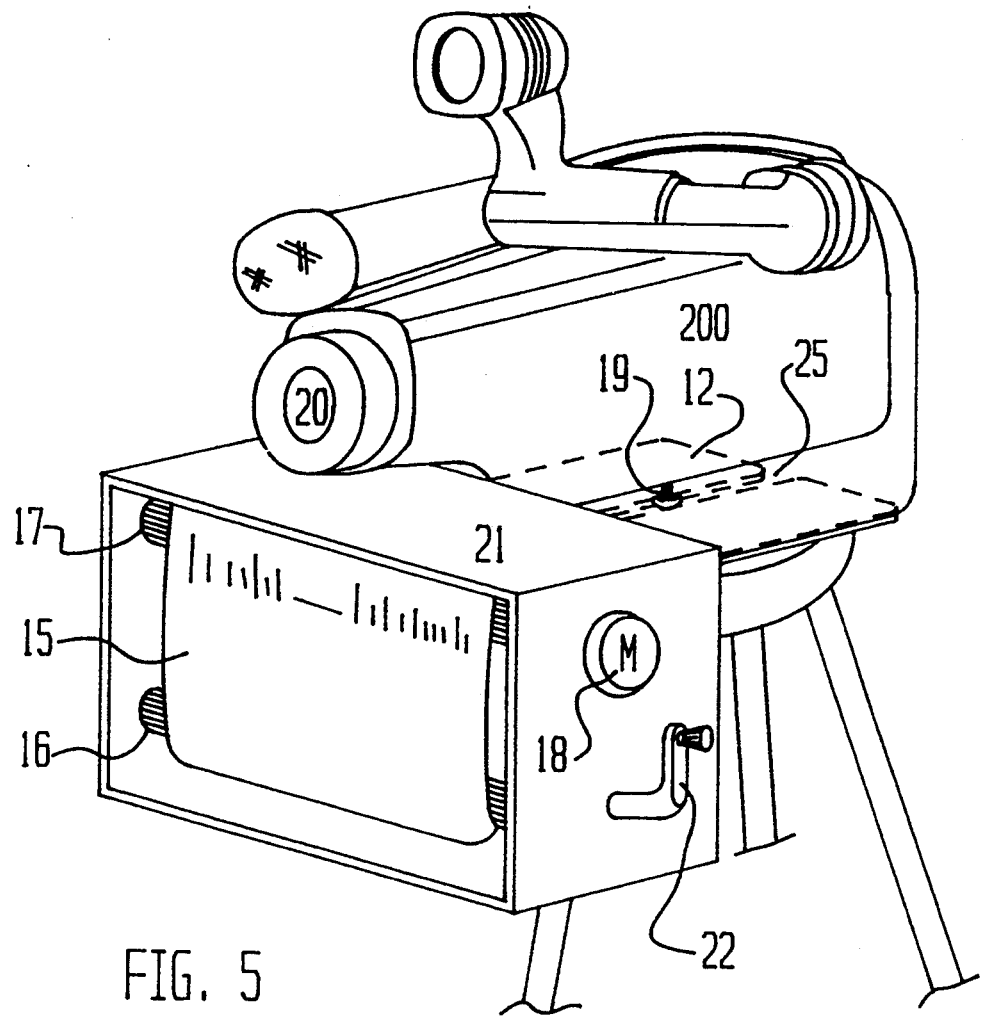
FIG. 5 is a view in perspective of the cuing apparatus shown in FIG. 4 with the unit mounted to the underside of a video camera.

In FIG. 5 we see the mounting plate 12 secured to the base of the video camera 200 by a bolt 19 threaded into the tripod socket on the underside of the video camera 200. This bolt 19 preferably should be ⅜ 20 thread which is common to most video camera tripod socket.

The longitudinal slot 25 in the mounting plate 12 enables the mounting plate 12 to mount to video cameras of varying lengths. The slot 25 is aligned with the loosened bolt 19 that is threaded into the tripod socket of the camera 200, and is then simply slid backwards until it stops, and then the bolt 19 is tightened. Thus the script housing is automatically positioned adjacent to and underneath the camera lens 20.

The shaft of the electric motor 18 rotates at a relatively slow speed of approximately 6 RPM (revolutions per minute) and will wind the script paper 15 up on the take-up roller 17. The motor 18 can be activated by the speaker or by an assistant standing out of the camera's field of view by pressing a momentary press switch wired into the electric line. Other means for activating the motor 18 includes remote wireless (not shown) which prior art for remote control devices is well known. If the motor 18 is variable speed RPM, the speed of the script advancement can be adjusted through a rheostat in the electric line so said script paper 15 will advance continuously, keeping pace with the speaker's rate of delivery, predetermined during a practice dry run.

This motor 18 has a slip-clutch which permits its motor shaft to be rotated by hand while the motor is not energized. Accordingly, the script paper 15 can be pulled downwards as it is being rewound back upon the bottom supply-roller 16 by manually turning the hand-crank 22. It is obvious that motorized rewinding methods can be employed (not shown).

In FIGS. 6, 7, and 8 I show a method of positioning the script-housing 21 in relation to the mounting plate 12. A raised position of the mounting plate 12 is seen with the dotted lines 12A in FIG. 7. This feature is desirable for positioning the textual information upon the script material 15 as close as possible under camera lens 20, shown in FIG. 5.

In FIGS. 6 and 7 it can be clearly seen that the forward end of the mounting plate 12 is bent at substantially 90 degrees and has a series of holes 23 for the nuts-and-bolts 24 to make this adjustment as well as to secure itself to the script-housing 21. This adjustment can raise or lower the script-housing 21 to bring it as close as possible to the camera lens 20, dependent on the individual video camera's configuration.

Horizontal positioning of the script-housing 21 is also attainable by utilizing the holes 23A seen in FIG. 6. Using holes 23A positions the script-housing 21 slightly off-center as illustrated in the bottom plan view of FIG. 8. Thus, when a video camera, particularly a small camcorder, is mounted upon the mounting plate 12, said script-housing 21, being off center would allow more room for the cameraman's hand to be inserted into the camera's hand strap when being hand-held.

Figure 9:
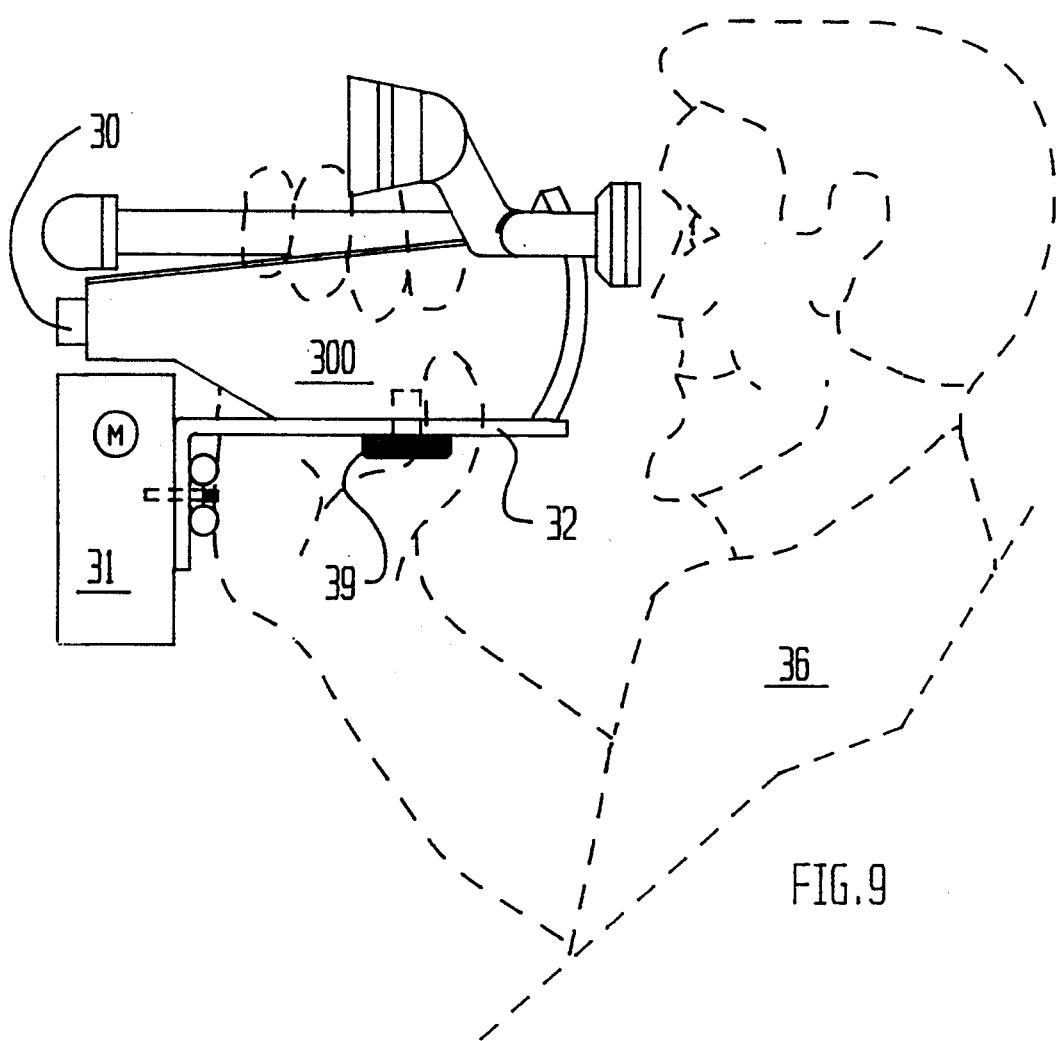
FIG. 9 is a side view of the cuing apparatus directly mounted to a video camera that is hand-held by the camera operator without requiring any support means.

In FIG. 9 I show a video camera 300 secured to the mounting plate 32 of the prompter 31 by a bolt 39 extending through a slit opening in said mounting plate 32, said bolt 39 threaded into the tripod hole on the underside of the base of said camera 300. The mounting plate 32 positions the prompter 31 as close as possible to the bottom of the camera lens 30. The camera operator 36 hand-holds the video camera 300 together with said prompter 31 secured directly thereto, without requiring any supporting means.

It is quite apparent that the mounting plate 12 and the script-housing 21 may be a single entity. This would be feasible when the prompter unit is made for specific video cameras having similar lens placement, thereby positioning the script-housing in its desirable location under the lens of these video cameras without requiring adjustment means.

It will be seen that apparatus has been provided with which the objects of the invention are achieved.

I claim:

1. A prompter for a video camera comprising a mounting plate of rigid material, means to secure said mounting plate to the base of said video camera wherein said video camera with said prompter secured thereto does not require any support means and is hand-held by a user, a script-housing supported by said mounting plate including means for movably adjusting the position of said script-housing in relation to said video camera, a take-up roller supported horizontally in said script-housing, a length of script material including textual information imposed thereon, one end which is attached to said take-up roller and the other end hanging down free unattached, said mounting plate secured to and positioning said script-housing so that it reposes adjacent to and in close proximity to the lens as well as under the lens of said video camera, said script material and its imposed textual information directly visible to a person in front of said video camera, an electric motor for winding said script material onto said take-up roller.

2. A prompter as in claim 1, said electric motor possessing a shaft that can be manually rotated when said motor is inactive.

3. A prompter for a video camera comprising a mounting plate of rigid material, means to secure said mounting plate to said video camera wherein said video camera with said prompter secured thereto does not require any support means and is hand-held by a user, a script-housing supported by said mounting plate including means for movably adjusting the position of said script-housing in relation to said video camera, a take-up roller supported horizontally in said script-housing, a length of script material including textual information imposed thereon with both ends of said script material fastened together to form a continuous loop hanging upon said take-up roller, said mounting plate positioning said script-housing so it reposes under the lens of said video camera adjacent to and in close proximity to said camera lens, said script material and its imposed textual information directly visible to a person in front of said video camera, an electric motor coupled to said take-up roller to advance said script material.

4. A prompter for a video camera comprising a mounting plate of rigid material, means to secure said mounting plate to said video camera wherein said video camera with said prompter secured thereto does not require any support means and can be hand-held by a user, a script-housing supported by said mounting plate, a take-up roller and a supply-roller horizontally supported in said script-housing, a roll of script material including textual information imposed thereon wound upon said supply-roller feeding to said take-up roller, said mounting plate positioning said script-housing so it reposes under the lens of said video camera adjacent to and in close proximity to said camera lens, said script material and its imposed textual information directly visible to a person in front of said video camera, an electric motor coupled to said take-up roller, and means to activate said electric motor for winding said script material onto said take-up roller.

5. A prompter for a video camera as in claim 4, further comprising means for moveably adjusting the position of said script-housing in relation to said video camera.

6. A prompter for a video camera as in claim 4, with means for rewinding said roll of script material back upon said supply-roller.

* * * * *